No. 685,322. Patented Oct. 29, 1901.
L. CLARK.
ELEVATED CABLE ROAD.
(Application filed Feb. 9, 1901.)
(No Model.) 2 Sheets—Sheet 1.
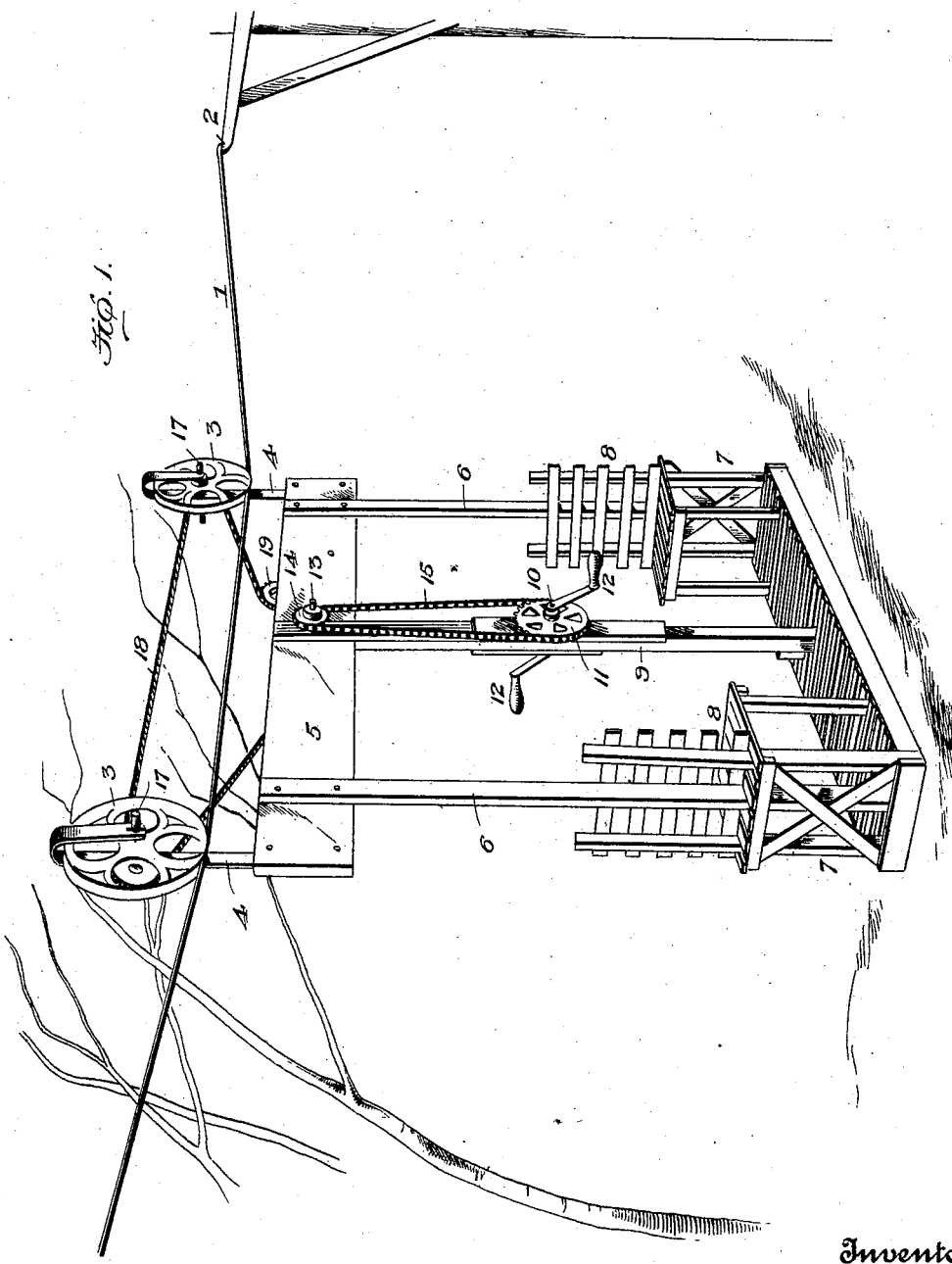
Witnesses
Inventor
Leander Clark

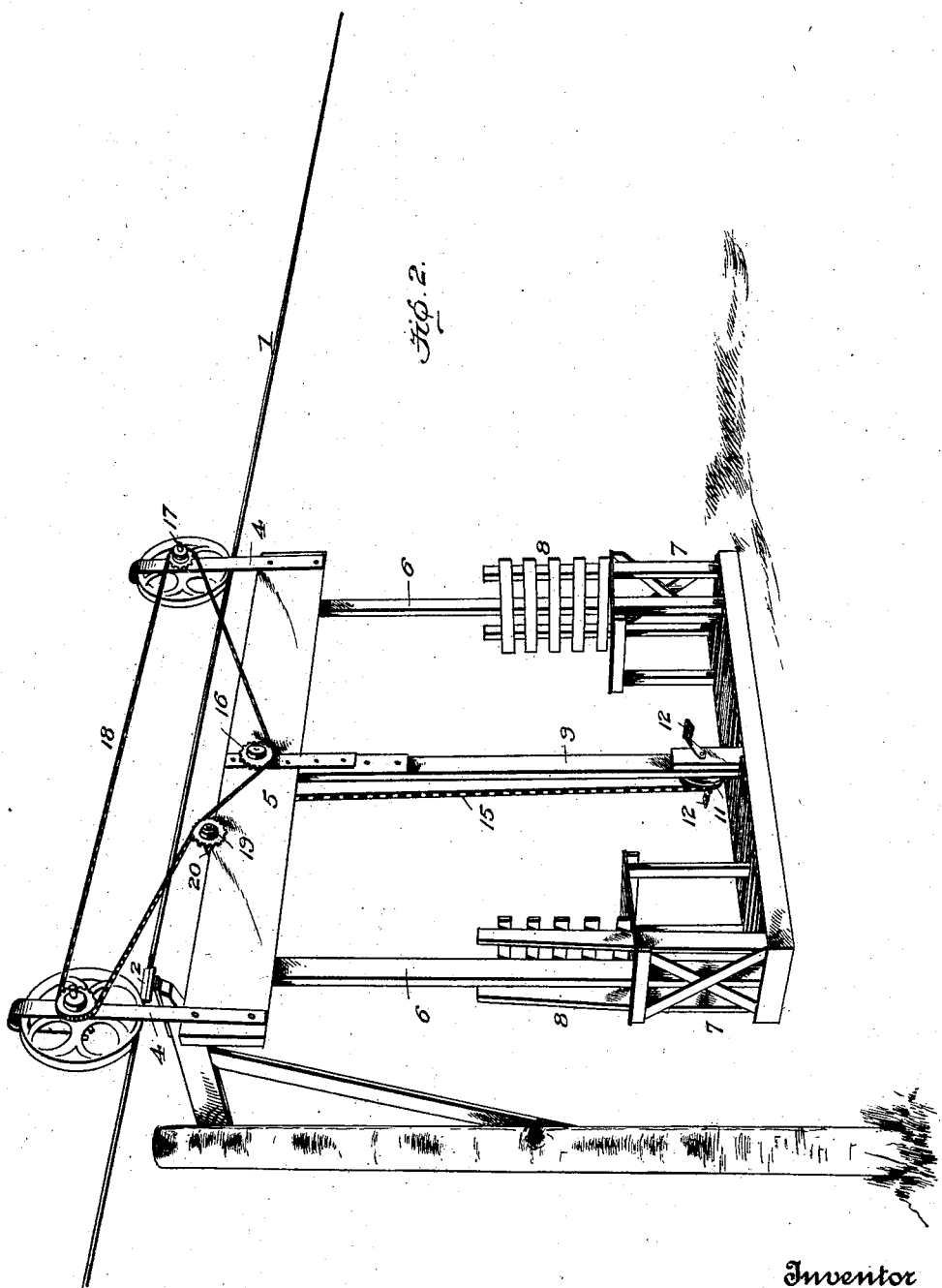

United States Patent Office.

LEANDER CLARK, OF GREENVILLE, OHIO.

ELEVATED CABLE-ROAD.

SPECIFICATION forming part of Letters Patent No. 685,322, dated October 29, 1901.

Application filed February 9, 1901. Serial No. 46,724. (No model.)

*To all whom it may concern:*

Be it known that I, LEANDER CLARK, a citizen of the United States, residing at Greenville, in the county of Darke and State of Ohio, have invented certain new and useful Improvements in Elevated Cable-Roads, of which the following is a specification, reference being had therein to the accompanying drawings.

My invention relates to improvements in trolleys and elevated cars therefor; and the main object is the provision of a trolley and car which is adapted to be operated by hand or feet to be propelled along the trolley.

Another object of my invention is the provision of a trolley and car therefor which is very simple, durable, and inexpensive in construction and very efficient and practical in use.

To attain the desired objects, the invention consists of a trolley and car embodying novel features of construction and combination of parts, substantially as disclosed herein.

In the drawings, Figure 1 is a perspective view of the trolley and the car, and Fig. 2 is a similar view taken from the other side.

Referring by numeral to the drawings, the numeral 1 designates a trolley which is mounted in the seats 2, which are connected to cross-trees connected to poles. Mounted upon the trolley are the grooved wheels 3, which are mounted in the hooked ends of the bars 4, which are connected to and support the long horizontal frame-piece 5, to which are connected the depending standards or supports 6, to which is connected the flooring-frame 7, upon which are mounted the chairs or seats 8. Connected to the frame-piece 5 and to the flooring frame or platform is the central standard 9, in which is journaled the shaft 10, upon which are mounted the sprocket-wheel 11 and the hand-crank or foot-levers 12, as circumstances may require. Fig. 1 shows the hand-power, and Fig. 2 the foot-power, apparatus. Journaled in the frame-piece 5 and also the central standard is shaft 13, carrying the sprocket-wheel 14, around which and the sprocket-wheel 11 a sprocket-chain 15 passes. Upon the shaft 13 on the other side of the frame-piece 5 is a small sprocket 16, around which and the sprocket-wheels 17, mounted upon the shafts of the grooved wheels 3, passes the sprocket-chain 18, whose tension is adjusted by means of the small sprocket-wheel 19, mounted in the metal fitting 20, connected to the frame-piece 5. If desired, only one of the grooved wheels, with a single sprocket-wheel and chain, may be employed, the chain then being connected directly to the sprocket-wheel 11.

From this description, taken in connection with the drawings, the operation of my trolley and car is readily understood, the motive power being started by the hand-crank or pedals, the series of sprockets and chains transmitting power to the grooved wheels mounted upon the wire.

It is evident that I provide a trolley and car which will afford a great amount of pleasure and amusement and which by reason of its simplicity, durability, and cheapness, both in construction and operation, is very useful and practical.

I claim—

1. The combination with a trolley, a pair of wheels mounted thereon, sprocket-wheels on the axles of said wheels, brackets or hangers in which the axles are journaled, a frame supported by the hangers, a platform or car supported by the frame, a cranked driving sprocket-wheel on the car, a sprocket-wheel arranged above the driving-sprocket, a driving-chain traveling over said sprocket-wheels, a pair of sprocket-wheels arranged on the opposite side of the frame, and a chain passing over said sprockets and the sprockets on the axles of the wheels for transmitting motion from the driving-chain to propel the car.

2. The elevated railway herein described, consisting of the car composed of the platform having a seat at each end, the central and end standards, the horizontal frame-piece connecting said standards, the bail-shaped hangers connected to the frame-piece, the wheels mounted in said hangers, the trolley on which said wheels travel, the sprocket-wheels on the horizontal piece and on the axles of the wheels, the chain traveling on said wheels, the upper and lower driving-sprockets, the lower one having cranks on its axle, and the driving-chain passing over said driving-sprockets.

In testimony whereof I affix my signature in presence of two witnesses.

LEANDER CLARK.

Witnesses:
S. V. HARTMAN,
E. LAWRENCE.